United States Patent

[11] 3,625,327

| [72] | Inventor | Harold Donald Birdsey<br>Newark, England |
|---|---|---|
| [21] | Appl. No. | 8,226 |
| [22] | Filed | Feb. 3, 1970 |
| [45] | Patented | Dec. 7, 1971 |
| [73] | Assignee | Ransome & Morles Bearing Co. Ltd. |
| [32] | Priority | Feb. 3, 1969 |
| [33] | | Great Britain |
| [31] | | 5,658/69 |

[54] CLUTCH CONTROL BEARINGS
11 Claims, 11 Drawing Figs.

[52] U.S. Cl................................................. 192/110 B,
192/98 R, 308/26, 308/140
[51] Int. Cl.............................................................. F16d 13/60
[50] Field of Search............................................ 192/110,
110 B, 98; 308/26, 140, 145, 184

[56] References Cited
UNITED STATES PATENTS

| 3,416,637 | 12/1968 | Maurice ........................ | 192/98 |
| 3,263,907 | 8/1966 | Nimwegen et al. ........... | 308/26 |
| 3,277,988 | 10/1966 | Pitner........................... | 192/110 B |

FOREIGN PATENTS

| 474,112 | 5/1937 | Great Britain................ | 192/110 R |
| 531,046 | 7/1940 | Great Britain................ | 192/98 |

Primary Examiner—Mark M. Newman
Assistant Examiner—Randall Heald
Attorney—Burns, Doane, Swecker & Mathis

ABSTRACT: A clutch control bearing wherein adjustment to compensate for eccentricity with respect to a shaft is accomplished by a resilient mounting interposed between a raceway and a hub plate. A wobble plate may be employed to permit further adjustment relative to the shaft.

INVENTOR
HAROLD DONALD BIRDSEY

BY Burns, Doane, Swecker & Mathis

ATTORNEYS

CLUTCH CONTROL BEARINGS

This invention relates to clutch control bearings which are often called clutch release bearings. It is well known that in conventional pedal operated clutch control systems, such as are normally used for example in motor vehicles, a thrust bearing is interposed between the foot pedal and a thrust plate. The thrust plate forms a part of the clutch mechanism proper which usually has a pressure plate and a clutch plate. The clutch is normally in its engaged position with the pressure plate in contact with the clutch plate and is disengaged by depression of the foot pedal which is operable to separate the pressure plate of the clutch from the clutch plate, the arrangement being such that the clutch control bearing transmits an axial thrust to the thrust plate which in turn disengages the clutch. Difficulties have been experienced with these clutch control bearings due to the fact that the bearings as hitherto designed are relatively rigid members and will not adapt themselves to a situation in which, to take one example, a clutch plate is moving eccentrically to the shaft center. It is an object of the present invention to provide an improved and more flexible clutch control bearing.

In accordance with the present invention we provide a clutch control bearing adapted to be slidably mounted on a shaft and comprising a hub plate or thrust member shaped to receive two annular members adapted to provide inner and outer rolling surfaces facing one another and forming race ways for antifriction members disposed between the raceways. The annular members are resiliently mounted in the thrust member so that the bearing may assume its correct position relatively to the shaft axis. In other words, the annular members, with the antifriction members, of the bearing may be shifted and realigned, as an assembly, with respect to both the shaft and hub plate so as to compensate for a clutch plate which is running eccentrically to the shaft axis. In this manner, i.e., radial movement of the assembly relative to the hub and shaft, the bearing assumes a correct position, whereby the annular members may be aligned with the clutch plate, regardless of any eccentricity of a clutch or clutch fingers with respect to the shaft plate which is running eccentric to the shaft centerline.

In more detail the invention includes a clutch control bearing comprising a hub plate shaped to receive two annular members adapted to provide inner and outer rolling surfaces facing one another and forming raceways for antifriction members disposed between the raceways characterized in this that the annular member forming the outer raceway is resiliently mounted in the hub plate by providing resilient means between the raceway and the plate so that the bearing may assume its correct position relatively to the shaft axis and will compensate for a clutch plate which is running eccentric to the shaft centerline.

The invention also includes a clutch control bearing comprising a hub plate shaped to receive two annular members adapted to provide inner and outer rolling surfaces facing one another and forming raceways for antifriction members disposed between the raceways characterized in this that the annular member forming the inner raceway is resiliently mounted in the hub plate by providing resilient means between the raceway and the shaft so that the bearing may assume its correct position relatively to the shaft axis and will compensate for a clutch plate which is running eccentric to the shaft centerline. The outer race member may be resiliently mounted in the hub plate by providing resilient pads set into slots in a flange on the hub plate and projecting radially inwardly therefrom to form a seating for the outer race member. As an alternative a flexible corrugated separator maybe used. In addition the race members maybe separated axially from the hub plate by an axial wobble plate provided with undulations or corrugations therein to allow the bearing to assume its correct attitude in any plane parallel to the shaft axis. The resilient pads are preferably made of a plastics material or a rubber composition and the separator or wobble plate is preferably made of spring metal.

The antifriction members may be balls, rollers or needles but preferably are balls. In order that the invention may be clearly understood and readily carried into effect reference is now directed to the accompanying drawings in which.

Figure 1:
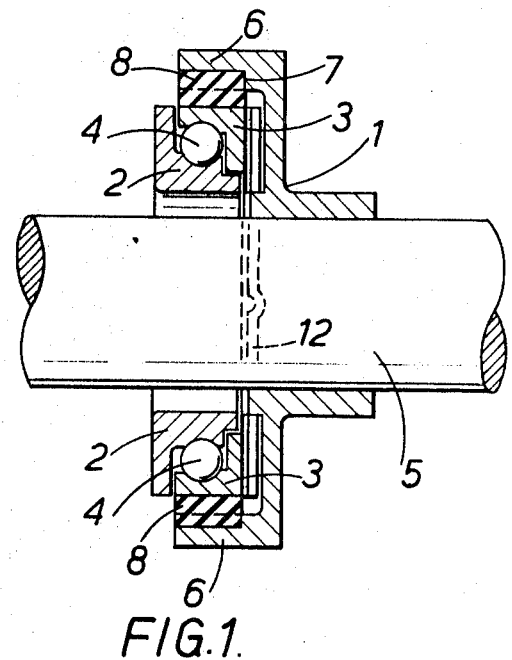
FIG. 1 is a longitudinal section of a clutch control bearing embodying the invention.
Figure 2:
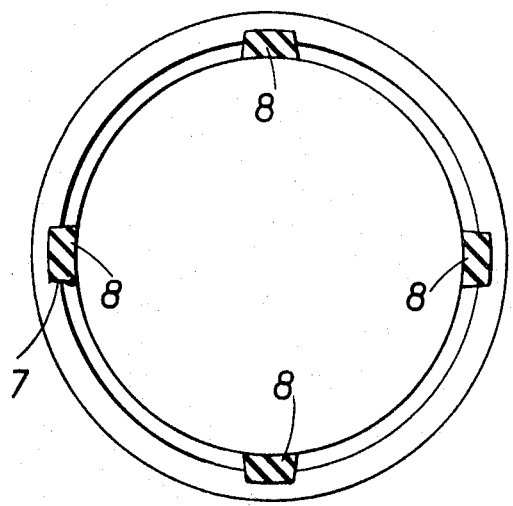
FIG. 2 is an outline cross section of FIG. 1.
Figure 3:
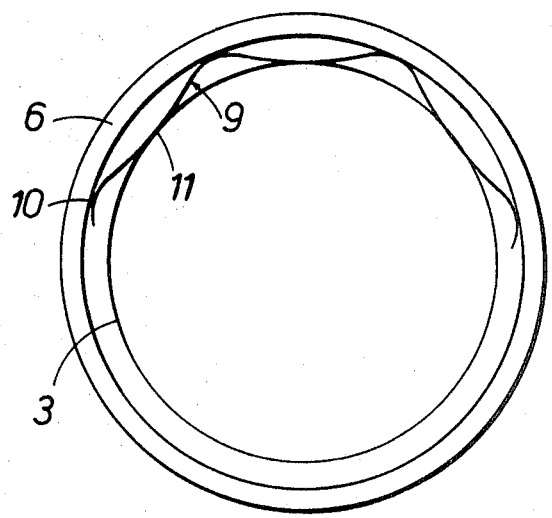
FIG. 3 is an outline cross section of a modification.
Figure 4:
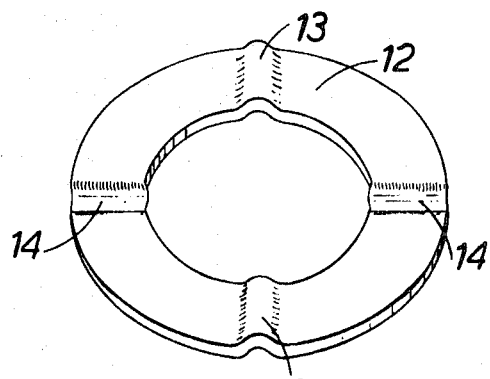
FIG. 4 is a perspective view of an axial wobble plate.
Figure 5:
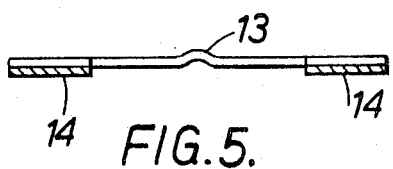
FIG. 5 is a section of FIG. 4.
Figure 6:
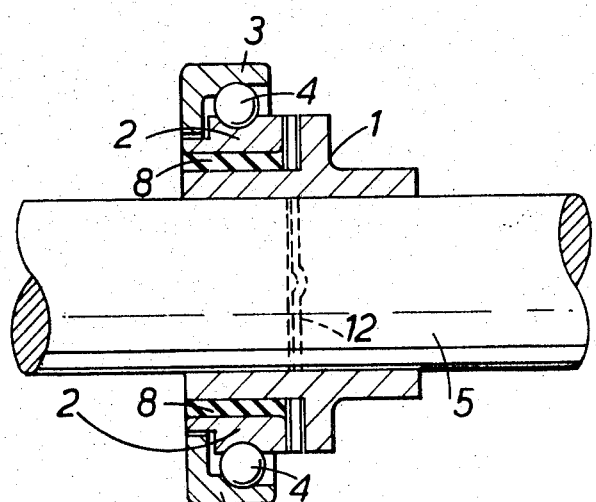
FIG. 6 is a longitudinal section of a modified form of the clutch control bearing embodying the invention.
Figure 7:
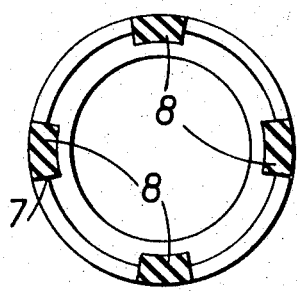
FIG. 7 is an outline cross section of FIG. 6.
Figure 8:
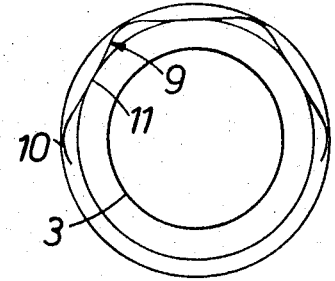
FIG. 8 is an outline cross section of a modified resilient member to be used with the bearing of FIG. 6.
Figure 9:
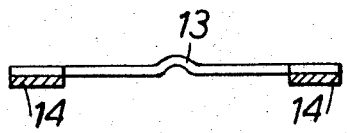
FIG. 9 is a cross section of the wobble plate of FIG. 6.
Figure 10:
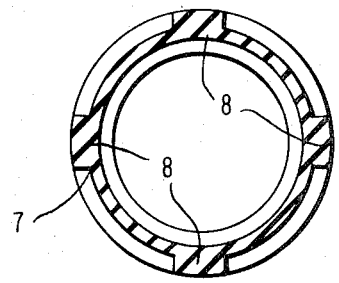
Figure 11:
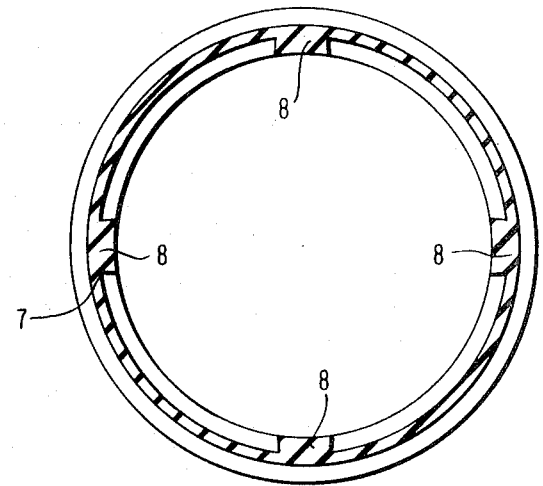

FIG. 10 is a cross section of a modified form of the radial resilient means to be used in connection with the bearing of FIG. 1; and FIG. 11 is a cross section of a modified form of radial resilient means to be used in connection with the bearing of FIG. 6. In FIGS. 1 and 2 a hub plate 1, as illustrated, is shaped to receive an inner annular or race member 2 and an outer annular or race member 3 which form raceways for balls 4, the members 2 and 3 and the balls 4 comprising an assembly. The hub plate and the assembly are mounted on a shaft 5. The plate 1 includes an axially extending annular flange 6 provided with slots 7 into which flexible and resilient radial separator pads 8 are inserted so that the outer race 3 is flexibly and resiliently mounted within the hub plate 1. As an alternative to the pads 8 we may use a corrugated flexible separator member 9, as illustrated in FIG. 3, the arrangement being such that the hills 10 of the separator member rest on the inner surface of the flange 6 of the plate 1 and the valleys 11 of the separator member rest on the outer surface of the race member 3. It will be understood that the resilient mounting permits the annular or race members 2 and 3 of the bearing to adjust to irregularities in the clutch by radial movement relatively to the shaft so that the centerline of the annular or race members 2 and 3 of the bearing does not coincide with the centerline of the shaft.

The race members 2 and 3 are separated axially from the hub plate 1 by an axial wobble plate 12 which has diametrically opposed corrugations 14 convex towards the other face and displaced by 90° from the corrugations 13. The axial wobble plate 12 allows the bearing to assume its correct position in any plane transverse to the shaft axis. For example if the protruding convex corrugations 13 are towards the bearing, tilting movement of the annular or race members 2 and 3 of the bearing is permitted relatively to a vertical pivot formed by the corrugation 13 and if the protruding convex corrugations 14 are towards the plate 1 tilting movement of the annular or race members 2 and 3 of the bearing is permitted relatively to horizontal pivot formed by the corrugations 14. In this way by a combination of the tilting movements any form of eccentricity or other irregularity can be compensated. Thus a clutch mechanism, moving either concentrically or eccentrically to the shaft center and with its own axis of rotation oblique to the shaft axis of rotation, can be handled by such a construction. Although we have described a wobble plate with four corrugations; as illustrated it is possible to use some other arrangement the essential requirement being to insert a wobble plate between the hub plate and the bearing adapted to permit tilting of the bearing in two directions.

We have therefore provided a clutch control bearing which when viewed as in FIG. 1 permits adjustment vertically by means of the flexible mounting and tilting relative to a horizontal and to a vertical axis by means of a suitably adapted wobble plate.

As a modification instead of simply having pads 8 or a corrugated member 9 as described above we may provide a continuous annular flexible and resilient member disposed between the outer raceway and the hub plate and provided with projecting lugs to locate on the hub plate 1 and/or on the outer race. Alternatively the annular member may be disposed between the inner raceway and the shaft so that the lugs locate on the shaft and/or the inner raceway.

A modification of the invention is illustrated in FIG. 6 7, 8 and 9 which correspond with FIGS. 1, 2, 3 and 5. In FIGS 6, 7, 8 and 9 the same references have been used as in the first five figures of the drawings ans it is not thought that any further detailed description is required.

What we claim is:

1. A clutch control bearing adapted to be slidably mounted on a shaft and comprising;
   a hub plate;
   a thrust assembly comprising;
   a pair of annular members;
   the annular members providing a pair of rolling surfaces facing one another and forming raceways; and antifriction members disposed between the raceways;
   the thrust assembly being mounted for substantially free radial movement with respect to the shaft; and
   resilient means operatively positioned between and engaging the hub plate and the thrust assembly to bias the thrust assembly toward radially central position and to yieldably permit the radical movement of the thrust assembly, to compensate for a clutch running eccentrically to the thrust assembly.

2. A bearing according to claim 1 wherein; the annular members are radially spaced; and the resilient means being positioned between the radially outermost annular member and the hub plate.

3. A bearing according to claim 1 wherein; the annular members are radially spaced; and the resilient means being positioned between the radially innermost annular member and the hub plate.

4. A bearing according to claim 2 wherein; the resilient means comprises an annular resilient member provided with radially projecting lugs.

5. A bearing according to claim 3 wherein:
   the resilient means comprises an annular resilient member provided with radially projecting lugs.

6. A bearing according to claim 2 wherein;
   the resilient means comprises a corrugated annular separator member.

7 A bearing according to claim 3 wherein:
   the resilient means comprises a corrugated annular separator member.

8. A bearing according to claim 2 wherein; the hub plate has a flange radially enclosing at least part of the outermost annular member;
   the flange being provided with a plurality of slots facing radially inwardly;
   the resilient means comprising resilient separator pads inserted into the slots and extending radially inwardly to contact the outermost annular member.

9. A bearing according to claim 1 and further including;
   a wobble plate axially positioned between the thrust assembly and the hub plate;
   the wobble plate including;
   first diametrically opposed corrugations convex towards the thrust assembly, and
   second diametrically opposed corrugations convex towards the hub plate,
   the second corrugations being displaced from the first corrugations to permit the thrust assembly to tilt axially with respect to the shaft.

10. A bearing according to claim 9 wherein the first and second corrugations each comprise a pair of corrugations, each pair being displaced by 90°.

11. A clutch control bearing adapted to be slidably mounted on a shaft and comprising;
    a hub plate;
    a thrust assembly including:
    a pair of annular members;
    the annular members providing a pair of rolling surfaces facing one another and forming raceways; and antifriction members disposed between the raceways; and
    a wobble plate including:
    first diametrically opposed corrugations convex in
    first diametrically opposed corrugations convex in one axial direction; and
    second diametrically opposed corrugations convex in the other axial direction and displaced 90° from the first corrugations;
    the wobble plate being positioned axially between the hub plate and the thrust assembly to permit the thrust assembly to tilt axially with respect to the shaft and the hub plate to compensate for irregularities between the clutch plate mechanism and the thrust assembly.

* * * * *